United States Patent Office

3,652,729
Patented Mar. 28, 1972

3,652,729
BRANCHED-CHAIN HYDROCARBON
ELASTOMERS
Nicolas Brodoway, Claymont, Del., assignor to E. I. du
Pont de Nemours and Company, Wilmington, Del.
No Drawing. Filed May 19, 1970, Ser. No. 38,861
Int. Cl. C08f 15/40
U.S. Cl. 260—878 R                    4 Claims

ABSTRACT OF THE DISCLOSURE

The incorporation of about 1%–10% by weight of polybutadiene units, each unit containing about 25–750 vinyl groups, in an EPDM elastomer produces chain branching with a consequent improvement in properties, such as cold-flow of the uncured stock, and improved ozone resistance of natural rubber blends.

BACKGROUND OF THE INVENTION

This invention relates to sulfur-vulcanizable, chain-saturated elastomeric, α-olefin copolymers having improved cold-flow resistance. This invention also relates to improving the ozone resistance of blends of chain-unsaturated diene polymers with sulfur vulcanizable, chain-saturated, elastomeric α-olefin copolymers by the introduction of a controlled amount of chain branching into the α-olefin copolymer.

Among the polymers of the aliphatic olefins that are made by use of coordination complex compounds of the transition metals as polymerization initiators, the amorphorus copolymers of ethylene with higher alpha-monoolefins constitute an important class because of their desirable elastomeric character and their generally excellent resistance to ozone and other chemicals. The chemical inertness of these polymers is attributed to the fact that the linear chain or "backbone" is a completely saturated structure without the reactive double bonds of the common elastomeric materials, such as natural rubber, or the synthetic elastomers made from conjugated diolefins. This chemical inertness made the early polyolefin elastomers, namely amorphous ethylene-propylene copolymers, impossible to vulcanize with the sulfur systems preferred in the rubber industry. This problem was solved by incorporating as third monomers, non-conjugated diolefins containing both a readily polymerizable and a relatively nonpolymerizable double bond, thus forming an elastomeric polymer consisting of a linear saturated backbone having pendant unsaturated hydrocarbon groups capable of participating in crosslinking reactions with sulfur curing systems. The use of non-conjugated aliphatic diolefins such as 1,4-hexadiene and 6-methyl-1,5-heptadiene as the third monomer in hydrocarbon elastomers of this sort is taught, for instance, in U.S. Pat. 2,933,480, and the use of bridged ring diolefins having double bonds of unequal reactivity is similarly taught in U.S. Pat. 3,211,709.

It is the nature of coordination complex polymerization of olefin hydrocarbons to form practically linear, unbranched polymer chains. While a strictly linear polymer structure is advantageous in the stiff, crystalline polyolefins used as thermoplastic molding materials, such as polyethylene and polypropylene, it is not necessarily so in amorphous polyolefins that are used as elastomers. As a matter of fact, it has been found that strictly linear polyolefin elastomers shown relatively undesirable cold-flow properties unless the polymer has an especially broad distribution of molecular weights. For example, the undesirable cold-flow properties cause the elastomer to rupture bags in which they are packaged during storage. However, such a distribution of molecular weights causes undesirably high viscosity of dilute solutions of the polymer in the solvents employed in their manufacture and use.

DESCRIPTION OF THE INVENTION

The present invention provides sulfur curable chain saturated branched elastomeric copolymers consisting essentially of (a) about 25%–75% by weight of ethylene units,
(b) about 1%–10% by weight of units of polybutadiene containing about 25–750 pendant vinyl groups per molecule,
(c) sufficient units of a non-conjugated diolefin containing only one polymerizable double bond to provide 0.1 to 4 gram moles/kilogram of carbon-carbon double bonds derived from the diolefin, and
(d) the remainder of said polymer being $C_3$ to $C_{18}$ α-monoolefin units, said copolymers being prepared by an organo-soluble coordination catalyst system.

The present invention also provides a sulfur curable ozone resistant composition consisting essentially of about 10 to 30 parts by weight of the copolymer of this invention and about 90 to 70 parts by weight of a polyunsaturated elastomer.

As used herein, the term "consisting essentially of" has its generally accepted meaning as requiring that specified components be present, but not excluding unspecified components which do not materially detract from the basic and novel characteristics of the composition as disclosed.

Methods for carrying out the polymerization of olefin hydrocarbons with coordination complex catalysts are well known in the art. See, for instance, "Linear and Stereoregular Addition Polymers," by Gaylord and Mark, Interscience Publishers, New York, 1959. Among the most useful catalyst systems for making elastomeric copolyolefins are those based on soluble compounds of vanadium such as vanadium oxytrichloride, vanadium tetrachloride, vanadium tris-(acetylacetonate), etc., used in conjunction with organoaluminum compounds such as aluminum alkyls (e.g. triisobutyl aluminum), and alkyl aluminum halides (e.g. diisobutyl aluminum chloride), and so on. It is preferred that a halogen be present on at least one of the catalyst components. Many variations and refinements of these catalyst systems are well known in the art. The particular organo-soluble catalyst system used is not critical to the practice of this invention as long as it is capable of forming practically amorphous copolymers of olefin hydrocarbons.

A variety of solvents can be employed with the catalyst. Among the most useful are tetrachloroethylene, and aliphatic hydrocarbons such as hexane. Other solvents will be apparent to those skilled in the art.

Methods for copolymerizing ethylene and propylene to form amorphous polymers that have the basic characteristics of a synthetic rubber are well known in the art. The principle of making such polymers vulcanizable with sulfur curing systems by introducing as a third polymerizable monomer a multiolefin having only one polymerizable double bond is also known. Polymerizable double bonds in coordination polymerization systems are generally found to be unhindered terminal double bonds in aliphatic olefins, or double bonds in strained ring cycloaliphatic compounds, such as cycloaliphatic compounds having one- or two-carbon bridged ring structures. Double bonds that are found not to be readily polymerizable are generally the internal, i.e., non-terminal double bonds of aliphatic olefins, such as those carrying two substituents on one of the doubly bonded carbon atoms, and double bonds in relatively unstrained cycloaliphatic rings. Typical non-conjugated diolefins containing only one polymerizable double bond that are suitable for preparing in the copolymers of this invention are 1,4-hexadiene, 2-methyl-1, 5-hexadiene, 1,9-octadecadiene, 6-methyl-1,5-heptadiene, 7-methyl-1,6-octadiene, 11-ethyl-1,11-trideca-diene, and the like. Typical cycloaliphatic compounds that can serve the same purpose include dicyclopentadiene, tricyclopentadiene, 5-ethylidene-2-norbornene, 5-methylene-2-norbornene, alkenyl substituted norbornenes having an internal double bond in the alkenyl group, e.g., 5-(2'-butenyl)-2-norbornene, unsaturated derivatives of bicyclo-(2,2,2)-octane, and so on. The use of such compounds to provide pendant sulfur-reactive unsaturated structures on an amorphous polyolefin is well known in the art.

As used herein, the term "polymerizable double bond" is meant terminal, unhindered double bonds in the main chain structure of the monomer, and the double bonds in strained ring cycloaliphatic structures. Suitable monomers may contain a terminal double bond or a strained ring double bond.

Amorphous copolyolefins including ethylene, propylene, and one or more of the above-mentioned diolefins made by the prior art methods are mainly straight-chain polymers and have the disadvantages already mentioned.

A desirable ramification, i.e. chain branching, can be introduced into polymers of the general class by including a carefully selected proportion of a fourth monomer. The monomer generally suitable for incorporation as the fourth monomer is a high molecular weight polybutadiene having vinyl groups along the molecule. Vinyl groups are represented by the formula

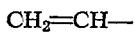
$CH_2=CH-$

The polybutadiene molecule containing vinyl groups can be represented by the formula

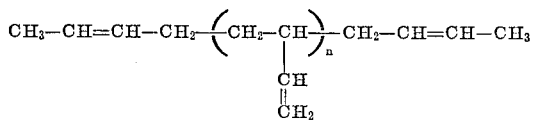

The internal $-CH=CH-$ groups of the molecule are practically inactive with respect to polymerization. The pendant vinyl groups are generally less reactive than the hydrocarbon dienes having only one readily polymerizable double bond such as 1,4-hexadiene, used in EPDM copolymers. However, if the molecular weight of the polybutadiene molecule is high enough, a larger number of pendant vinyl groups will be present on each molecule. There will exist a greater opoprtunity for a vinyl group to react, and thereby incorporate the polybutadiene molecule into the EPDM copolymer. By properly selecting the polybutadiene to be used, almost complete incorporation of the polybutadiene into the copolymer can be attained.

The polybutadiene to be used is conveniently described in terms of the number of vinyl groups it contains. It is preferred that each polybutadiene molecule contains about 25–750 vinyl groups. The number of vinyl groups in a polybutadiene molecule can be determined by infrared analysis as described by J. Haslam and H. A. Willis, Identification and Analysis of Plastics, pp. 188–191, D. Van Nostrand Co., Inc., 1965. The elastomeric copolymer of this invention has incorporated therein about 1%–10% by weight of a polybutadiene containing about 25–750 vinyl groups. It is preferred to use about 1%–6% of a polybutadiene by weight of the copolymer.

Although polybutadiene is generally preferred for incorporation as the fourth monomer, minor amounts of other monomers, such as styrene and isoprene, can also be present. The polybutadiene molecules can also have an occasional $-CH_2-CH=CH_2$ group at one end of the molecule, in which case this may be a reactive site.

The conversion of the polybutadiene is related to the conversion of the diene having only one polymerizable double bond. It is preferred to use a polybutadiene having about 30 vinyl groups when the conversion of the diene having only one polymerizable bona is about 30%. When the diene conversion is about 10%, it is preferred to use a polybutadiene having about 150 vinyl groups. At lower diene conversions, a larger number of vinyl groups on the polybutadiene are required to obtain desired branching.

Analysis of the amount of polybutadiene containing pendant vinyl groups incorporated in the polymer has proved difficult in some cases. However, it has been found that 1–10% of polybutadiene having at least about 150 vinyl groups per molecule is incorporated quantitatively when the conversion of diene having only one polymerizable double bond is at least 10%.

The branched copolymers of the present invention consist essentially of a linear chains or "backbones" with branching along the chains. These branched copolymers differ from previously known EPDM copolymers having a practically linear structure. Chain branching is demonstrated by the fact that the copolymers of this invention have physical properties substantially different than those of practically linear copolymers, such as known EPDM copolymers. The properties of the copolymer used to detect branching are the solution (inherent) viscosity and bulk viscosity as indicated by the Wallace plasticity. For example, the inherent viscosity and Wallace plasticity of a practically linear copolymer and a branched copolymer are measured as described below. The results are compared, and the branched copolymer shows a greater rate of change in Wallace plasticity than the rate of change in inherent viscosity. Thus, for a given inherent viscosity, the Wallace plasticity is greater for the branched than for the unbranched copolymer.

Mooney viscosity is measured at 121° C. in accordance with ASTM Method D–1646–67 using the large rotor. After the sample has been warmed in the machine for one minute, the shearing disc viscometer motor is started to begin the test. Four minutes later the reported viscosity reading is taken.

Wallace plasticity is a measure of the amount of flow or deformation of unvulcanized elastomeric materials under load. The sample to be tested is sheeted and cut into pellets having a thickness in the range 3.18–6.35 mm. (0.125–0.300 inch). The test is performed with a Wallace plastimeter manufactured by H. W. Wallace and Co., Ltd., London. During a 10-second period the pellet is simultaneously compressed to exactly 1.0 mm. in thickness and heated to 100° C., the resulting test piece is then subjected to a 10 kg. load for exactly 15 seconds at 100° C. The final thickness of the test piece, expressed in units of 0.01 mm., is the plasticity value reported. The standard 1-cm. diameter platen is suitable for pellets of average hardness. Proper platen temperature regulation is most important because elastomer plasticity is usually temperature dependent. Plasticity readings should normally fall between 20 and 90 on the scale for most reliable readings.

The elastomeric products of the present invention can be processed with conventional rubber processing equipment in the same way as other sulfur curable α-olefin based elastomers, particularly those elastomers having a broad molecular weight distribution.

Conventional compounding ingredients such as carbon black, inorganic fillers, coloring agents, extending oils and the like are generally incorporated into the polymers.

Various curing systems can be employed, as will be apparent to those skilled in the art. The most important of these curing system is the sulfur curing system which is applicable to all of the polymers within the scope of this invention. Other curing systems include quinoid curing systems, phenolic curing systems and peroxide curing systems.

The polymers of the present invention have improved cold flow resistance when isolated, compared with elastomers having the same proportions of ingredients and made with the same catalyst but omitting the modifying amount of polybutadiene containing side vinyl groups. The above improvement is indicated by the increased Wallace plasticity. The Wallace plasticities of the branched products are substantially higher than those of linear polymers having the same solution viscosity.

This invention is further illustrated by the following specific examples. All parts, proportions, and percentages are by weight unless otherwise indicated.

EXAMPLE 1

Preparation of polybutadiene containing pendant vinyl groups

A 5-liter, 4-necked flask is equipped with a condenser and addition funnel containing cold fingers to which a mixture of Dry Ice and acetone can be added, a magnetic stirrer, and a syringe inlet. The entire assembly is dried with the aid of heat and held under a dry nitrogen atmosphere. One liter of anhydrous hexane is added and cooled to 0° C. A 17.8 ml. portion of a 25% butyl lithium solution (Foote Mineral Company) in hexane, and a 4.4 ml. portion of anhydrous reagent grade tetrahydrofuran are added to the reaction flask through the syringe inlet. Butadiene, which has been dried by passing through a tower packed with molecular sieves (3A), is condensed on the cold finger of the addition funnel and added to the reaction flask. The reaction mixture is maintained at 0–10° C. during the addition of butadiene. A total of 546 grams of butadiene is added over about a one-hour period. The flask contents are stirred at 0–10° C. for another 3.25 hours after the butadiene addition is complete. (The ratio of monomer to catalyst is 375:1.) The contents are then allowed to warm up until butadiene refluxing starts. Within one hour the temperature is raised to 36° C. with only a small amount of refluxing. The temperature falls slowly to room temperature without external cooling. After standing overnight, a solution of 0.842 gram of Santowhite crystals, 4,4'-thiobis-(3-methyl-6-tert-butylphenol), in 52.6 ml. of isopropanol and 347.4 ml. of hexane is added. The reaction mixture is washed three times with water and the organic portion is concentrated by distillation at reduced pressure (100° C. at 1 mm. of Hg). The non-volatile residue weighs 548.7 grams indicating a complete conversion of butadiene to non-volatile fluid polymer. The inherent viscosity of the polymer is 0.31 measured using 0.1 g. of polymer in 100 ml. of perchloroethylene at 30° C. The polymer contains 250 vinyl groups, and 1,2-polymerization is 69.8 mole percent.

EXAMPLE 2

Preparation of branched polymers from E/P/1,4-hexadiene/PBD

Polymerization is carried out an a continuous process using a liquid-full, 1.2 liter, stainless steel reactor. The pressure in the reactor is maintained at 100 p.s.i.g. by passing the reactor effluent through a pressure regulator. Monomers, catalyst ingredients and solvent are fed to the reactor through calibrated rotameters. Ethylene, propylene and 1,4-hexadiene are fed as pure ingredients, whereas polybutadiene and the catalyst ingredients are fed as solutions in hexane. In a typical polymerization, ethylene is fed at a rate of 3.75 g. moles per hour, propylene at 5.93 g. mole per hour, 1,4-hexadiene at 0.393 g. moles per hour, polybutadiene (from Example 1) at 8.0 grams per hour, $VOCl_3$ at 0.12 millimole per hour, triethylaluminum at 1.2 millimoles per hour, diethylaluminum chloride at 2.4 millimoles per hour, benzotrichloride at 3.6 millimols per hour, and hydrogen at 1.5 millimoles per hour. Hexane is fed at a rate to give an average residence time in the reactor of twenty-four minutes. A total feed of hexane of 2.364 liters per hour is required. The reactor temperature is maintained at 42.5° C. with external cooling. Polymer production is at an average rate of 165.4 grams per hour. The reactor effluent is discharged into a flasher where unreacted ethylene and propylene are allowed to evaporate at atmospheric pressure. To the liquid residue in the flasher is added a solution of isopropanol and Santowhite crystals in hexane (100 ml./hr. of a solution of 8.0 grams of Santowhite crystals in 500 ml. of isopropanol and 3.5 liters of hexane) to destroy the catalyst and protect the polymer during isolation. The stabilized effluent is washed by vigorous stirring with a 5% acetic acid solution, followed by three more washings with water. The polymer is isolated by removal of the hexane and traces of water on a drum drier. The polymer composition is 4.8% of polybutadiene, 34.2% propylene, 3.4% 1,4-hexadiene, and 57.6% ethylene by weight. The Wallace plasticity at 100° C. is 60, the inherent viscosity (0.1 g. in 100 g. of perchloroethylene at 30° C.) is 2.48, and the Mooney viscosity (ML–4 at 121° C.) is 74.

EXAMPLE 3

Using the same general procedure as in Example 2, the polybutadiene (inherent viscosity=0.36) feed is increased to 11.5 grams per hour with ethylene, propylene, and 1,4-hexadiene feeds the same as in Example 1. The hydrogen feed is six millimoles per hour, $VOCl_3$ at 0.102 millimole per hour, triethylaluminum at 1.806 millimoles per hour, diethylaluminum chloride at 1.566 millimoles per hour, and benzotrichloride at 3.6 millimoles per hour. Polymer is produced at 157.2 grams per hour. The polymer contains 7.3% of polybutadiene, 33.4% of propylene, 3.3% of 1,4-hexadiene, and 56% of ethylene by weight. The inherent viscosity (0.1 g. in 100 ml. of perchloroethylene at 30° C.) is 2.16. The Mooney viscosity (ML–4 at 121° C.) is 56.

The branched-chain elastomeric copolymers of this invention have been found to be especially useful in blends with polyunsaturated elastomers, such as natural rubber, and the synthetic diene elastomers. Particularly useful are styrene/butadiene elastomers (e.g. SBR containing 23.5% styrene by weight), polybutadiene, and butadiene/acrylonitrile, (e.g. NBR having 20–45% acrylonitrile). Natural rubber, styrene/butadiene, and polybutadiene are preferred. It is known in the art that the EPM and EPDM elastomers confer a measure of ozone resistance on such blends, but it has surprisingly been found that the branched-chain tetrapolymers of this invention are much more effective than the prior art terepolymers as illustrated by the following experiment.

EXAMPLE 4

A masterbatch is prepared in a Farrel "midget Banbury mixer" (having a 250 ml. void) by combining 20 grams of the tetrapolymer of Example 2, 50 grams of natural rubber, 30 grams of neoprene, type W, 3.5 grams of zinc oxide, 25 grams of FEF carbon black, and 3.0 grams of naphthenic petroleum oil (Circosol Light Oil). Then the following curing ingredients consisting of 0.5 gram of 2,2'-dithiobisbenzothiazole, 0.35 gram of diphenylguanidine, 2.0 grams of stearic acid and 1.2 gram of sulfur are added at about 50° C. on a 4 x 8" rubber mill. Slabs made from the resulting stock, are cured for 20 minutes at 160° C. between "Mylar" polyester sheets. Dumbbells are cut with a die and clamped in the "Dynamat" attachment in a chamber at 40° C. where the ozone concentration is maintained at 0.5 p.p.m. and the samples are flexed for a period for 24 hours.

The tetrapolymer of Example 2 imparts good ozone resistance to the blends (no cracks on surface) whereas a control blend substituting a tripolymer of ethylene, propylene and 1,4-hexadiene (made by a similar process) for the tetrapolymer displays poor ozone resistance (surface covered with many small cracks).

I claim:

1. A sulfur curable chain saturated branched elastomeric consisting essentially of (a) about 25–75% by weight of ethylene units,
(b) about 1%–10% by weight of units of polybutadiene containing about 25–750 pendant vinyl groups per molecule,
(c) sufficient units of a non-conjugated diolefin containing only one polymerizable double bond to provide 0.1 to 4 gram moles/kilogram of carbon-carbon double bonds derived from the diolefin, and
(d) the remainder of said polymer units being $C_3$ to $C_{18}$ α-monoolefin units.

2. Composition of claim 1 wherein the diolefin (c) is 1,4-hexadiene.

3. Composition of claim 2 wherein the α-monoolefin (d) is propylene.

4. Composition of claim 3 wherein the polybutadiene of (b) is about 1%–6% by weight of the copolymer.

References Cited

UNITED STATES PATENTS

| | | | |
|---|---|---|---|
| 3,494,983 | 2/1970 | Diem | 260—878 |
| 3,498,963 | 3/1970 | Ichikakwa et al. | 260—94.3 |
| 3,522,332 | 7/1970 | Ichikawa et al. | 260—94.3 |

FOREIGN PATENTS

| | | |
|---|---|---|
| 1,448,105 | 6/1966 | France. |
| 1,151,941 | 2/1964 | Germany. |

JOHN C. BLEUTGE, Primary Examiner

U.S. Cl. X.R.

260—5, 45, 95, 80.7, 80.78, 876 R, 889